No. 770,964. PATENTED SEPT. 27, 1904.
H. HILDE.
GLASS FURNACE.
APPLICATION FILED MAR. 15, 1904.
NO MODEL. 2 SHEETS—SHEET 1.
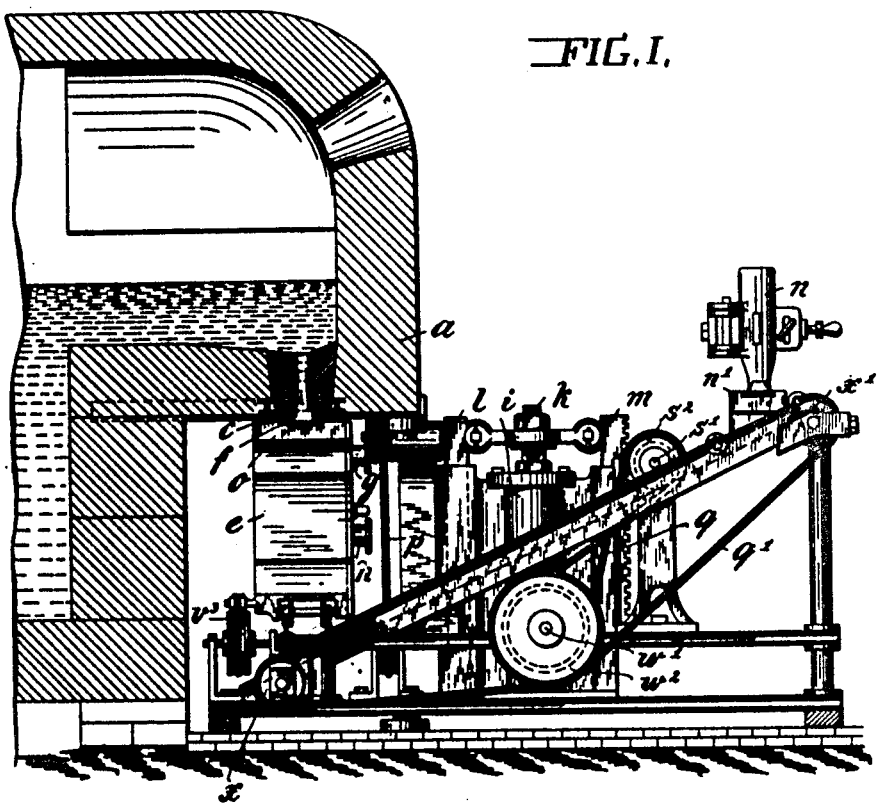
FIG. I.
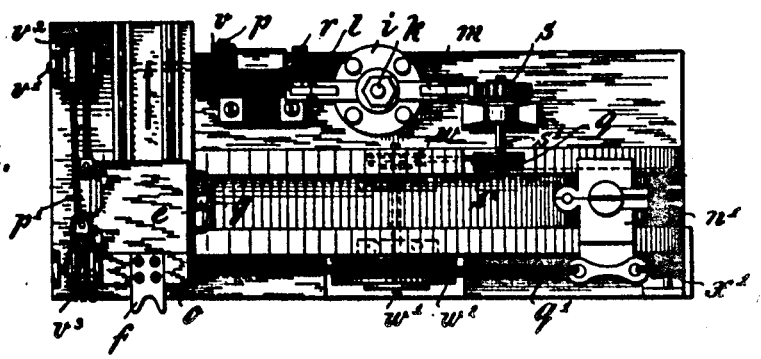
FIG. 2.
WITNESSES:
W. Rabriller
L. Staaden.
INVENTOR:
Hermann Hilde,
by Alfred Müller,
Atty.

No. 770,964. PATENTED SEPT. 27, 1904.
H. HILDE.
GLASS FURNACE.
APPLICATION FILED MAR. 15, 1904.
NO MODEL. 2 SHEETS—SHEET 2.

WITNESSES: INVENTOR:

No. 770,964.  
Patented September 27, 1904.

UNITED STATES PATENT OFFICE.

HERMANN HILDE, OF ROSSWEIN, GERMANY.

GLASS-FURNACE.

SPECIFICATION forming part of Letters Patent No. 770,964, dated September 27, 1904.

Application filed March 15, 1904. Serial No. 198,213. (No model.)

*To all whom it may concern:*

Be it known that I, HERMANN HILDE, a subject of the King of Prussia, Emperor of Germany, residing at Rosswein, in the Kingdom of Saxony, German Empire, have invented certain new and useful Improvements in Glass-Furnaces, of which the following is a specification.

Modern glass-working machinery—such as blowing and rolling machines, presses, &c.—if it is to be utilized to the greatest advantage renders special contrivances necessary for rapidly receiving measured quantities of molten glass from the furnace and transporting the same to the machines where these individual quantities of glass are to be worked up.

My invention relates to contrivances serving the purpose mentioned.

The apparatus is remarkable for the accurate manner in which it performs its work, and is particularly adapted for a glass-furnace from which the molten glass is run directly into the transport vessel or cuvette belonging to the glass-working machine and which may be some form of mold or any other receptacle which is brought below the outlet of the furnace.

According to one very practical method of carrying out my invention I employ a member for closing the furnace-outlet, coupled with positive motion by mechanical driving means, such as a motor or the like, with a glass-transporting receptacle or mold. The latter is thus likewise driven by the said motive power, traveling to the glass-furnace and returning to the glass-working machine or place where the transport vessel is disengaged from the said driving means for further treatment. The arrangement is such that the closing member is retreated from the furnace-outlet for the purpose of exposing it at the same time or immediately after the transport vessel reaches the said outlet in order to receive a charge of molten glass.

The accompanying drawings show one form of construction of my apparatus.

Figure 4:
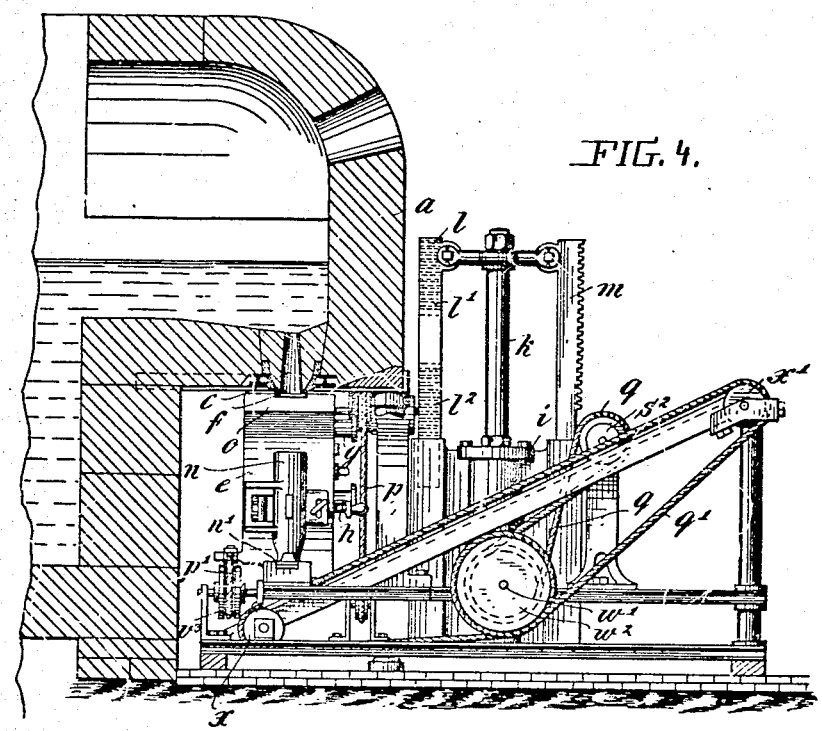
Figure 3:
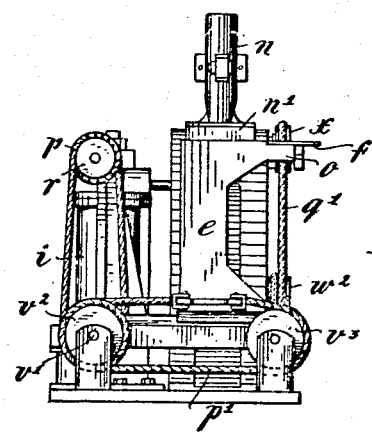

Figure 1 is a side view of the transport vessel, in conjunction with the furnace-outlet-closing apparatus and machinery for operating the same located before a furnace, shown in section and partly broken off. Fig. 2 is a plan of Fig. 1, the furnace being omitted. Fig. 3 is an end elevation of Fig. 2. Fig. 4 is a similar view to Fig. 1, showing the transport vessel located below the furnace-outlet.

$a$ is an overhanging portion of the furnace, provided with an outlet $c$, normally closed by a traveling block $e$. When the latter is removed from the position shown in Figs. 1 and 2—*i. e.*, is pulled back in the direction of the arrow, Fig. 2—and the transport vessel $n$ at the same time is brought below the outlet, Fig. 4, the molten glass will flow from the furnace into the vessel $n$ through the channel $c$. The block $e$ consists of a hollow body provided with knife $f$ and flange-pipes $g\ h$ and can slide or run horizontally in guideways or on rails in the direction of the arrow shown in Fig. 2 or in opposite direction. The knife $f$ is for the purpose of severing the rope of molten glass hanging from the channel $c$ on the latter, having again to be closed by the said block $e$. The pipes $g\ h$ are designed for connection to pipe or hose conduits, whereby a cooling agent may be caused to circulate through the block, so as to protect it from becoming overheated by the molten glass.

In the drawings a pneumatic machine $i$ is shown for operating or transporting the block $e$ and the vessel $n$. At each stroke of the piston the vessel $n$ is brought from its position shown in Fig. 1 to the position shown in Fig. 4—*i. e.*, below the outlet $c$, and simultaneously therewith the block $e$ for the purpose of making way for the vessel $n$ is retreated from the outlet $c$ in the direction of the arrow shown in Fig. 2 to such extent that the outlet is only closed by the projecting portion or nose $o$ of the block. When the vessel $n$ has actually reached its place below the outlet $c$, the block $e$ is retreated still farther—that is to say, into its farthest position, so that the outlet $c$ is opened and molten glass allowed to run out into the vessel $n$. When the latter is sufficiently charged, the attendant allows the piston of the machine $i$ to descend, whereby the block $e$ is caused to advance to its intermediate position, cut off the glass rope with its knife $f$, and then close the outlet $c$ with its nose $o$, whereupon the vessel $n$ retreats from the position shown in Fig. 4 into that shown in Fig. 1. As the vessel $n$ approaches the latter position the block $e$ takes up its normal position below the outlet $c$, Fig. 2.

The pneumatic machine $i$ is of well-known construction. The piston-rod $k$ is rigidly connected with two racks $l\ m$, engaging in pinions $r\ s$, respectively. The rack $l$ is provided with two separate rows of teeth $l'$ and $l^2$ for producing at each stroke the two movements of the block $e$ in the direction of the arrow shown in Fig. 2 or in opposite direction. When the piston of the machine $i$, Fig. 1, moves upward, the teeth $l'$ only engage the pinion $r$ and they remain in engagement with the pinion for about one-third of the stroke only, corresponding to the first or partial movement of the block $e$ in the direction of arrow shown in Fig. 2. At the further upward movement of the piston $i$ the rack $l$ is out of engagement with the pinion $r$ until the teeth $l^2$ engage the pinion $r$, corresponding to the final movement of the block $e$ in the direction of the arrow in Fig. 2. The motion of the pinion $r$ is transmitted by the rope $p$ and pulley $v$ to the shaft $v'$ and the pulley $v^2$, keyed to the other end of the latter. Round the pulley $v^2$ and twin pulley $v^3$ there runs a rope $p'$, the ends of which are secured to the sliding block $e$ in such manner that the latter follows the motion of the driving-gear, and, as described, changes its position below the overhanging portion $a$ of the furnace. The rack $m$, engaging with the pinion $s$, is provided with one set of teeth only. When the piston-rod $i$, Fig. 1, of the machine moves upward, the rack $m$ acts to drive the pinion $s$ for the purpose of transporting the vessel $n$ from the position shown in Fig. 1 to that in Fig. 4. The rack $m$ disengages from the pinion $s$ just before the teeth $l^2$ of the rack $l$ come into engagement with the pinion $r$. On the shaft $s'$ of the pinion $s$ is mounted the pulley $s^2$, which, by means of the rope $q$, pulley $w$, shaft $w'$, pulley $w^2$, transmits the motion of the piston-rod $k$ to the rope $q'$, running over the pulleys $x\ x$ and connected to the base $n'$ of the vessel $n$. Thus the latter is caused to travel from the position shown in Fig. 1 to that shown in Fig. 4, and vice versa, as the piston-rod $k$ moves up and down.

What I claim as my invention, and desire to secure by Letters Patent, is—

1. The combination, in a glass-furnace plant, of a glass-furnace having a discharge-aperture, with a glass-transport vessel, a contrivance closing the said discharge-aperture, and driving mechanism causing the vessel to travel to and from the furnace-outlet and simultaneously therewith the said contrivance to respectively open and close the furnace-outlet, substantially as described.

2. The combination, in a glass-furnace plant, of a glass-furnace having a discharge-aperture $c$, with a glass-transport vessel $n$, a block $e$, having a nose $o$, closing the furnace-discharge aperture, a motor having a piston-rod $k$, racks $l$, $m$ rigidly connected therewith, pinions $r\ s$ driven by the said racks, and systems of ropes and pulleys driven by the pinions and causing the vessel $n$ to travel to and from the furnace-outlet, and simultaneously therewith the block $e$ by two distinct movements to open, and by two distinct counter movements to close, the furnace-outlet, the outlet-opening being kept temporarily closed by the block-nose until the vessel $n$ stands below it, and being again temporarily closed by the nose immediately the vessel $n$ is charged, substantially as described.

3. In combination in a glass-furnace plant, of a glass-furnace having a discharge-aperture $c$, with a glass-transport vessel $n$, a hollow block $e$ having a nose $o$ closing the furnace-discharge aperture, a motor having a piston-rod $k$, racks $l\ m$ rigidly connected therewith, pinions $r\ s$ driven by the said racks, and systems of ropes and pulleys driven by the pinions and causing the vessel $n$ to travel to and from the furnace-outlet, and simultaneously therewith the block $e$ by two distinct movements to open, and by two distinct counter movements to close, the furnace-outlet, the outlet-opening being kept temporarily closed by the block-nose until the vessel $n$ stands below it, and being again temporarily closed by the nose immediately the vessel $n$ is charged, and means for cooling the block by circulation through it, substantially as described.

In testimony whereof I have signed my name to this specification in the presence of two subscribing witnesses.

HERMANN HILDE.

Witnesses:
CARL GARZ,
FRIEDRICH WEGNER.